Patented Oct. 25, 1927.

1,646,838

UNITED STATES PATENT OFFICE.

JAMES W. SCHWAB, OF GULF, TEXAS, ASSIGNOR TO TEXAS GULF SULPHUR COMPANY, OF BAY CITY, TEXAS, A CORPORATION OF TEXAS.

METHOD OF TREATING SULPHUR.

No Drawing. Application filed January 30, 1924. Serial No. 689,564.

This invention relates to the treatment of sulphur, and more particularly to the treatment of sulphur containing impurities, such as small amounts of organic impurities, the presence of which impart to the sulphur an abnormal color or other objectionable property. The invention has for its object the provision of an improved method of treating such sulphur to improve its color and/or to ameliorate its other objectionable properties.

Sulphur is commonly produced or mined by underground fusion in accordance with the well-known Frasch process. In this process a fusing fluid, such as superheated water under pressure, is conveyed to the underground sulphur deposit where its heat is utilized in fusing the sulphur and the fused or melted sulphur is collected in the so-called sulphur wells and raised to the surface of the ground in a molten condition by suitable agencies, such, for example, as an air lift pump. The molten sulphur is then permitted to solidify and forms what is known in the industry as crude sulphur.

Crude sulphur as mined by the Frasch process is more nearly a pure substance than many carefully purified chemically pure chemicals. It often assays 99.95% sulphur and averages well over 99.5% sulphur. But crude sulphur always contains, in addition to minute amounts of inorganic matter, traces of impurities which affect its burning qualities and sometimes its color. These latter impurities are largely organic matter and are present in the sulphur on account of its contact with petroleum or bituminous substances which occur in the sulphur-bearing formations. The organic impurities are usually referred to as "oil."

Ordinary crude sulphur generally assays from $\frac{1}{100}$% to $\frac{3}{100}$% oil, but frequently contains larger amounts of oil. There does not seem to be any direct relationship between the amount of oil present in the sulphur and its color. Sulphur containing $\frac{2}{100}$% oil may be dark brown in color, while other sulphur containing as much as $\frac{7}{100}$% to $\frac{8}{100}$% oil may be a bright yellow color.

Oil and sulphur react very rapidly at the temperatures prevailing at the burning point of sulphur itself and form black, asphaltic compounds which discolor the sulphur making it nearly black, and when burned an asphaltic film forms on the surface of the sulphur which ultimately extinguishes the flame. I have found that oil and sulphur react very slowly at the temperatures ordinarily prevailing in mining operations. If, however, crude sulphur is held for some time at the temperatures prevailing in mining operations, it loses its normal bright yellow color and becomes darker yellow or brownish in color. So, in actual mining, if sulphur as it is melted in the deposit does not happen to drain readily to a producing well, it may remain in the liquid state long enough for some of the oil to react with it and cause it to lose its characteristic bright yellow color and become dark. And, should the temperature of the molten sulphur become abnormally high so that the sulphur becomes viscous, then the color of the sulphur becomes dark more rapidly. The particular shade (that is color) of the solid sulphur probably depends upon how long it had remained in the liquid state before it finally reached a producing well and was removed from the deposit and solidified, and perhaps also, to some extent, upon the temperature attained by the sulphur while molten.

While the color of crude sulphur can be fairly well controlled by careful placing of producing wells with reference to the portion of the sulphur deposit being mined, still there are often wells that produce dark or abnormally colored sulphur. In ordinary mining partice, it seems impossible not to produce some sulphur which in chemical composition and properties is practically identical with bright yellow sulphur, but which is dark or abnormal in color. The color of this dark sulphur leads those accustomed to bright sulphur to assume that it is inferior in quality and is, therefore, a drawback to the sale of a product which is equal in quality to bright yellow sulphur.

The present invention contemplates the provision of a method of treating dark or abnormal colored sulphur to improve its color and more particularly to restore dark sulphur to its normal and characteristic bright yellow color. The invention also contemplates the provision of an improved method of removing oil and similar impurities from sulphur. In its broad aspect, the invention involves treating the sulphur in a molten condition with an adsorbent hydrous aluminum silicate material, and subsequently separating the sulphur from the adsorbent material and such adsorbed or occluded impurities as have become associated therewith. Thus, the invention involves bringing dark colored sulphur, in a molten or liquid condition, into intimate contact with substances capable of adsorbing or occluding the dark colored impurities and in some cases a part or all of the oil. After a varying period of contact, depending upon the substance used, of from a few minutes to several hours, the sulphur is separated from the adsorbtive substance and its adsorbed or occluded impurities by any appropriate means. The product is sulphur of a bright yellow color which may or may not contain noticeably less oil than before treatment.

Various substances are available for the practice of the invention and I shall herein refer to these substances generically as adsorbent hydrous aluminum silicate materials. However, I wish it to be understood that I do not thereby intend to imply that the beneficial action of these materials is due solely to adsorption. On the contrary, it is my present belief that occlusion or absorption may and probably does take place, although to what extent the beneficial action of these materials is due, if at all, to these or other phenomena I am not now prepared to say.

The molten or liquid sulphur may be brought into the desired intimate contact with the adsorbent hydrous aluminum silicate material in any convenient manner, such, for example, as by agitation with the adsorbent material, or by filtration through a medium composed of or appropriately containing the active adsorbent material. A variety of adsorbent hydrous aluminum silicates have been found suitable for the practice of the invention, such, for example, as fuller's earth, kaolin, and the like.

I have found that fuller's earth possesses, to a marked extent, the properties desirable for the practice of the present invention, and under proper conditions this substance eliminates the dark colored impurities in the sulphur as well as large percentages of the oil therein. Infusorial earth, diatomaceous earth, pumice, and other substances of similar properties are also more or less effective in removing the dark colored impurities from the sulphur in accordance with my present invention, but these substances have generally been found less effective than fuller's earth.

The amount of the adsorbent hydrous aluminum silicate material required in the practice of my invention varies with different materials and with the amount of dark colored impurities and oil to be eliminated from the sulphur. In the case of fuller's earth less than 5% by weight on the amount of sulphur treated is usually sufficient to restore the color of the sulphur to the characteristic bright yellow and to remove a large percentage of the oil. In case it is desired to remove substantially all of the oil from the sulphur, larger percentages of fuller's earth may be required.

The temperature at which the sulphur and the adsorbent hydrous aluminum silicate material are brought into contact may vary within wide limits. From an operating standpoint, it is preferable to bring about this contact at temperatures ordinarily now used in handling liquid sulphur, that is, from 250° to 330° F. It is to be understood, however, that higher temperatures, or even lower temperatures, may, if desired, be employed in the practice of the present invention.

The time of contact required for improving the color of sulphur and for the removal of the impurities therefrom varies with the particular substance used, with the percentage of the substance used, and with its degree of comminution. With finely divided fuller's earth only a few minutes are required to get effective results. With less finely divided fuller's earth much longer periods of contact may be required. The time of contact required will also vary with the character of the sulphur treated and with the degree to which it is desired to carry decolorization and oil removal.

The manner in which the necessary contact between the liquid sulphur and the substance used for removing the impurities is brought about may vary according to conditions. In most cases I prefer either to percolate the molten sulphur through a bed of the adsorbent material, or to agitate the molten sulphur with the adsorbent material and afterwards remove the latter by any suitable means such as by settling and decanting, filtering, centrifuging, or the like.

The activity of the adsorbent material is reduced by continued use in accordance with the invention by taking up a substantial amount of sulphur and impurities. In some cases the adsorbent material may be effectively reactivated or revivified and used again. Fuller's earth may be thus reactivated by heating to 800°–1200° F. in the presence of air, and may then be reused in the practice of the invention. While it seems probable that after each such reactivation there is a loss in efficiency, my investigations indicate that it is possible to reuse fuller's earth at least five to ten times and possibly more. The adsorbent material may also be reactivated by dissolving the adsorbed or occluded organic matter and sulphur in a suitable solvent, such, for example, as carbon bisulfide or carbon tetrachloride.

The invention will be further illustrated by the following examples:—

*Example No. 1.*

Percolation through a bed of adsorbent hydrous aluminum silicate material.

A piece of one inch pipe, appropriately arranged to be heated to about 260° F., was fitted with a screen for supporting fuller's earth and with a valve for controlling the rate of flow of liquid or molten sulphur therethrough. This pipe was first filled with molten refined sulphur. Fuller's earth such as is used in the petroleum industry, previously heated to about 1000° F. and screened to definite sizes, was poured into the liquid sulphur in the pipe as follows: 20 grams of 16–30 mesh, 20 grames of 30–60 mesh, and 78 grams of 60–80 mesh. This formed a column or bed of fuller's earth about ten inches in height, of which about seven and one-half inches was taken up by the 60–80 mesh material. The fuller's earth in settling through the molten sulphur was sufficiently classified according to sizes so as to form a very effective filter. After soaking for several hours, the refined molten sulphur was drained from the pipe. The fuller's earth absorbed about twice its weight of sulphur.

A very dark liquid or molten crude sulphur assaying 0.08% oil was then percolated through this column or bed of fuller's earth at an average rate equivalent to about one long ton per square foot of filtering area per day. Molten sulphur was discharged from the filter about five minutes after the first molten sulphur was poured on top of the column or bed of fuller's earth. The sulphur continued to flow through the column of fuller's earth at a fairly uniform rate. The filtered sulphur was in all cases free from fuller's earth.

There was only the barest trace of oil present in the first 800 grams of sulphur filtered. The oil content of the sulphur filtrate gradually increased until when 1500 grams of sulphur had been filtered, it had reached $\frac{1}{100}$%. After 3000 grams had been filtered, the oil content of the sulphur filtrate was $\frac{5}{100}$%, and after 4500 grams of sulphur had been filtered the oil content had risen to approximately the same amount ($\frac{8}{100}$%) as present in the unfiltered crude sulphur. The color of the sulphur filtrate was a very bright yellow until after 3000 grams had been filtered, and from then on the filtered sulphur gradually lost its very bright color and became slightly darker. When 5500 grams had been filtered, the sulphur filtrate could no longer be classed as "bright", although it was still yellow in color and of much improved color with respect to the unfiltered crude sulphur.

In carrying out the present invention it is now my practice to record the color of the sulphur in accordance with the following classification:—Crude sulphur such as used in this example "(6)"; first 3000 grams filtered "(1)"; 3000 to 3900 grams filtered "(1+)"; 3900 to 4500 grams filtered "(2)"; 4500 to 5500 grams filtered "(2+)".

The sulphur treated in this example was unusually dark and this example is therefore too severe to be typical of average practice, both on account of the very dark color and the exceptionally high oil content of the sulphur treated.

*Example No. 2.*

In this example a dark sulphur of lower oil content was treated. The relative proportions of the various sizes of fuller's earth used and the other conditions were substantially the same as in the first example except that the rate of flow of the molten sulphur was equivalent to 0.8 long tons per square foot per day. After 5500 grams of this dark sulphur (4+) had been percolated through 80 grams of fuller's earth, the sulphur filtrate was still bright (1+). The oil content of the untreated sulphur was $\frac{32}{1000}$%, while after 5500 grams had been filtered the oil content of the sulphur filtrate was a little below $\frac{30}{1000}$%.

Throughout the preceding description, particular stress has been laid on the application of the invention to the improvement in the color of off-color sulphur. It should be noted, however, that the principles of the invention may be advantageously applied in the refining of sulphur. Thus, the invention may be effectively used in removing oil and similar impurities from sulphur of satisfactory color. In fact, my investigations have indicated that by the practice of the invention, using fuller's earth, a more complete refining of sulphur can be obtained than by the usual method of subliming.

I claim:—

1. The method of improving the color of abnormally colored sulphur which comprises passing the sulphur in a molten condition through an appropriate bed containing fuller's earth whereby the molten sulphur is brought into intimate contact with the fuller's earth and the sulphur after passing therethrough is more nearly of the characteristic yellow color of normal colored sulphur.

2. The method of treating sulphur containing impurities, such as small amounts of organic matter, which impart to the sulphur an abnormal color, which comprises bringing the sulphur in a molten condition into intimate contact with fuller's earth and separating the molten sulphur from the fuller's earth and thereby obtaining sulphur of a color substantially approximating the characteristic normal yellow color.

3. The method of treating sulphur containing impurities, such as small amounts of organic matter, which impart to the sulphur an abnormal color, which comprises agitating the sulphur while molten in the presence of finely divided fuller's earth, and separating the molten sulphur from the fuller's earth and thereby obtaining sulphur of a color substantially approximating the characteristic normal yellow color.

4. The method of treating sulphur containing impurities, such as small amounts of organic matter, which impart to the sulphur an abnormal color, which comprises passing the sulphur while molten through a medium containing finely divided fuller's earth and thereby substantially improving the color of the sulphur and removing from the sulphur a substantial portion of the impurities.

5. The method of treating sulphur containing impurities, such as small amounts of organic matter, which impart to the sulphur an abnormal color, which comprises bringing fuller's earth into intimate contact with the sulphur at a temperature from about 250° F. to about 330° F., and separating the molten sulphur from the fuller's earth and thereby obtaining sulphur of a color substantially approximating the characteristic normal yellow color.

6. The method of treating sulphur containing contaminating constituents, such as small amounts of organic impurities, which impart to the sulphur an abnormal color, which comprises bringing fuller's earth which has been previously subjected to a temperature of about 800° F. to about 1200° F. in the presence of air into intimate contact with the sulphur while molten, and separating the molten sulphur from the fuller's earth and thereby obtaining sulphur of a color substantially approximating the characteristic normal yellow color.

7. The method of treating sulphur containing contaminating impurities which comprises passing the sulphur in a molten condition through a medium containing fuller's earth and thereby removing a large part of the contaminating impurities from the sulphur.

8. The method of treating sulphur containing impurities such as small amounts of organic matter, which impart to the sulphur an abnormal color, which comprises, bringing an adsorbent hydrous aluminum silicate into intimate contact with the sulphur at a temperature from about 250° F. to about 330° F., and separating the molten sulphur from the adsorbent material and thereby obtaining sulphur of a color substantially approximating the characteristic normal yellow color.

In testimony whereof I affix my signature.

JAMES W. SCHWAB.